UNITED STATES PATENT OFFICE.

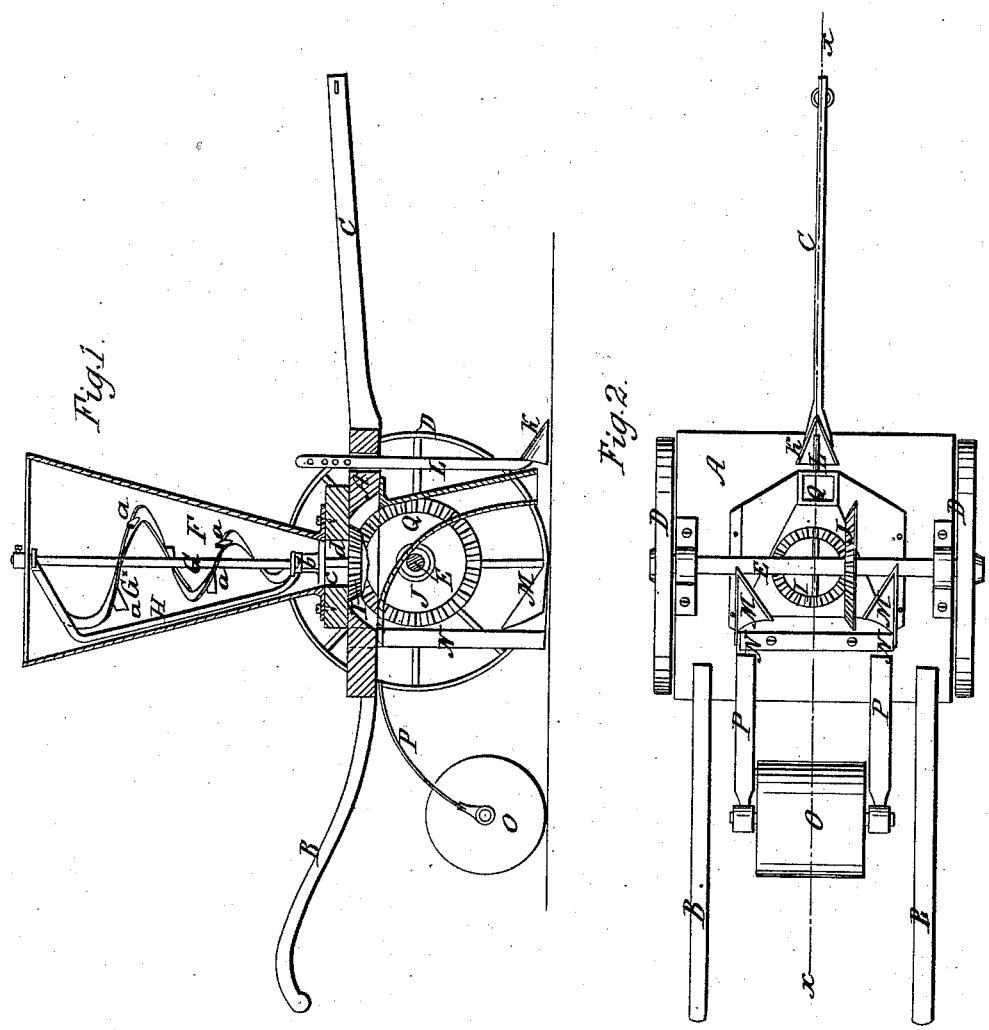

ALBANY PACKHAM, OF PRESTONSVILLE, KENTUCKY.

IMPROVEMENT IN COTTON-SEED PLANTERS.

Specification forming part of Letters Patent No. 54,942, dated May 22, 1866.

*To all whom it may concern:*

Be it known that I, ALBANY PACKHAM, of Prestonsville, in the county of Carroll and State of Kentucky, have invented a new and Improved Cotton-Seed Planter; and I do hereby declare that the following is a full, clear, and exact description thereof, which will enable others skilled in the art to make and use the same, reference being had to the accompanying drawings, forming part of this specification, in which—

Figure 1 is a side sectional view of my invention, taken in the line $x\ x$, Fig. 2; Fig. 2, an inverted plan of the same.

Similar letters of reference indicate like parts.

This invention relates to a new and useful machine for planting cotton-seed; and it consists of a conical hopper provided with a rotating spiral-toothed seed-distributer, all being constructed, arranged, and placed on a mounted frame provided with a furrow-opener, covering-shares, and a roller, to operate in the manner substantially as herein shown and described.

A represents a horizontal platform or frame, having handles B B attached to its rear end and a draft-pole, C, secured to its front end. This platform or frame is mounted on two wheels, D D, the latter being keyed or otherwise secured on their axle E.

F is an inverted conical hopper secured on the platform or frame A, and having a vertical shaft, G, fitted centrally within it. To this shaft G the seed-distributer G* is attached. This seed-distributer is composed of a strip of metal or other material bent or curved in spiral form, the convolutions gradually increasing in diameter from the lower to the upper end of the shaft G, so as to conform to the shape of the hopper, as shown clearly in Fig. 1. The top and bottom ends of this spiral strip are connected by a bar, H, which is quite close to and parellel with the side of the hopper F, and the spiral strip has flanges or teeth $a$ attached to it at a suitable distance apart, said flanges or teeth having an oblique position, so as to have a tendency, as the spiral strip rotates, to throw the cotton-seed toward the center of the hopper.

The lower end of the shaft G has a collar, $b$, upon it, and this collar rests upon a support, $c$, at the lower end of the hopper. The shaft G extends down through an opening, $d$, in the platform or frame A, and has a bevel-gear, I, upon it, into which a bevel-gear, J, on the axle E gears. By this means a rotary motion is communicated to the distributer as the machine is drawn along.

K represents a furrow-opener secured to the lower end of an upright, L, which passes loosely through the platform or frame A, and is secured by a pin passing through any of a series of holes in the upright.

M M are two covering-shares, which are attached to the lower ends of uprights N N, secured to the platform or frame A, and O is a covering-roller, the axis of which is fitted in springs P P, the latter projecting back from the rear of the platform or frame.

As the machine is drawn along the furrow-opener K makes the furrow, and the distributer G* or toothed spiral strip causes the seed to be detached and thrown toward the center of the hopper, while the bar H prevents the seed from sticking to the side of the hopper, and the seed is forced down and discharged from the bottom of the hopper through a tube, Q, into the furrow made by the furrow-opener K, the shares M M covering the seed and the roller O pressing the earth down upon the same.

The tube Q is not essential, and may be dispensed with, if desired.

The covering-shares, furrow-opener, and pressure-roller are all old and well-known devices.

Having thus described my invention, I claim as new and desire to secure by Letters Patent—

The inverted conical hopper F, in combination with the rotary spiral-toothed strip or seed-distributer G*, with bar H attached, all arranged on a mounted frame, to operate in the manner substantially as and for the purpose herein set forth.

ALBANY PACKHAM.

Witnesses:
JAMES M. MITCHELL,
S. S. CARLISLE.